Jan. 6, 1925.
J. J. MORSCH
1,522,380
SHOCK ABSORBER
Filed Feb. 13, 1924
2 Sheets-Sheet 1
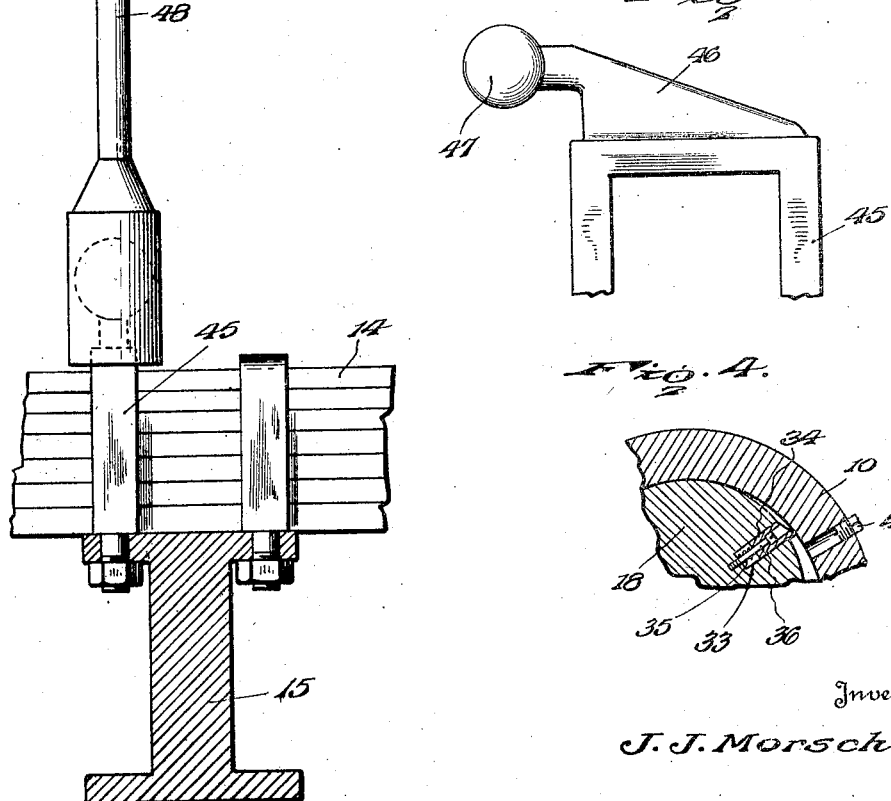
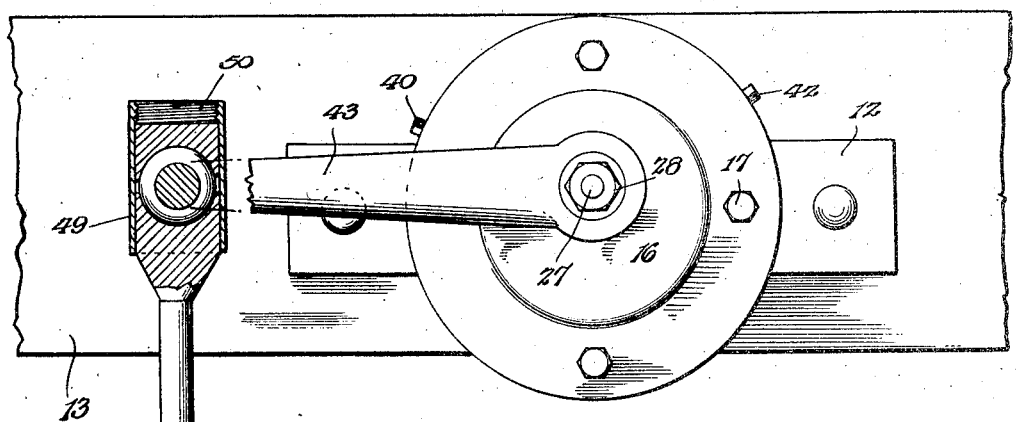
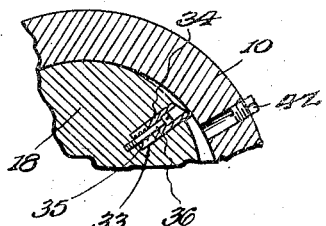
Inventor
J. J. Morsch.
By Lacey & Lacey, Attorneys Jan. 6, 1925.
J. J. MORSCH
1,522,380
SHOCK ABSORBER
Filed Feb. 13, 1924  2 Sheets-Sheet 2
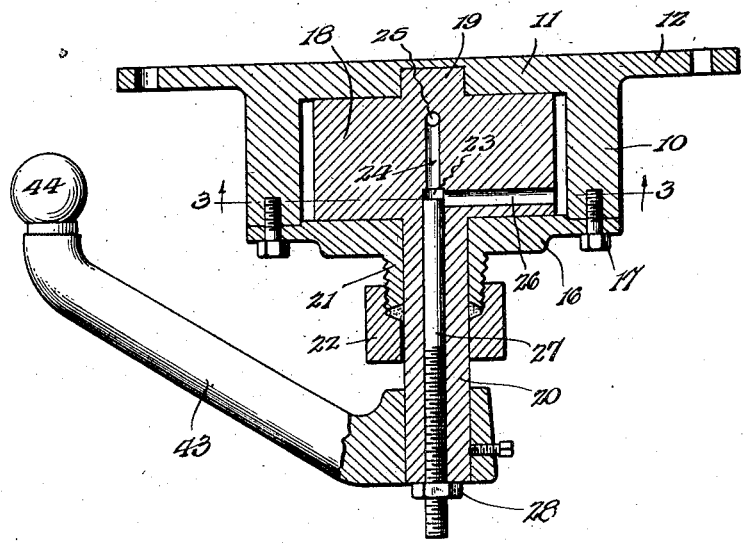
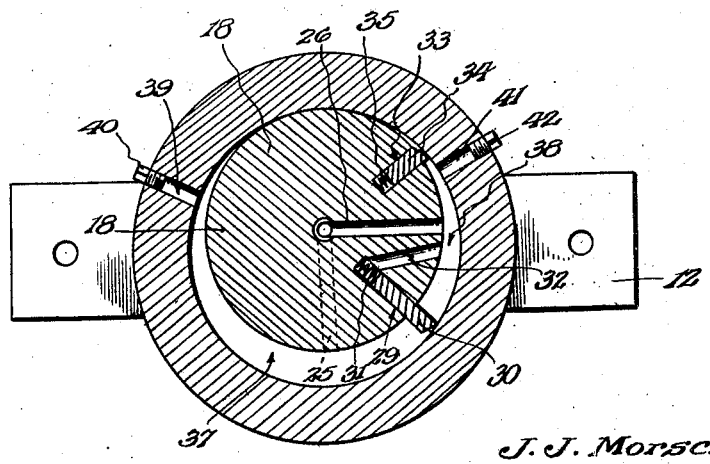
Inventor
J. J. Morsch.
By Lacey & Lacey, Attorneys Patented Jan. 6, 1925.

1,522,380

UNITED STATES PATENT OFFICE.

JESSE J. MORSCH, OF DOUGLAS, WYOMING.

SHOCK ABSORBER.

Application filed February 13, 1924. Serial No. 692,559.

*To all whom it may concern:*

Be it known that I, JESSE J. MORSCH, citizen of the United States, residing at Douglas, in the county of Converse and State of Wyoming, have invented certain new and useful Improvements in Shock Absorbers, of which the following is a specification.

This invention relates to an improved shock absorber for motor vehicles and seeks, among other objects, to provide a device of this character which will function to oppose rebound on the vehicle body by a fluid cushion for thus controlling and regulating such rebound.

The invention seeks, as a further object, to provide a device which will operate to offer a tapering resistance to the rebound of the vehicle body diminishing gradually as the tension upon the vehicle springs is relieved to thus effect a smooth return flexing movement of the springs.

And the invention seeks, as a still further object, to provide a device which may be readily applied and which will be well adapted for general use.

Other and incidental objects will appear hereinafter.

In the drawings:
Figure 1 is a side elevation showing my improved device applied, parts being broken away and illustrated in section, Figure 2 is a horizontal sectional view through the device, Figure 3 is a sectional view on the line 3—3 if Figure 2, looking in the direction of the arrows, Figure 4 is a detail sectional view showing the leading blade of the abutment, Figure 5 is a detail sectional view through said blade, and Figure 6 is a fragmentary elevation showing the anchoring clip employed.

In carrying the invention into effect, I employ a cylindrical casing 10 closed at one end by an end wall 11 from which projects lugs 12 apertured to accommodate bolts or other suitable fastening devices for securing the device to a vehicle chassis frame bar, as conventionally illustrated at 13. One of the front springs of the vehicle is indicated at 14 and the front axle at 15. Closing the casing at the open end thereof is a removable end plate 16 detachably secured in position by a plurality of cap bolts 17 and arranged within the casing is a rotary abutment 18. At one side, the abutment is provided with a stud 19 journaled in a suitable socket in the end wall 11 of the casing and extending from the abutment at its opposite side is a spindle 20. Fixed upon the plate 16 to surround the spindle is a bushing 21 journaling the spindle and screwed upon said bushing is a gland 22 for the spindle. Formed in the spindle axially thereof is a bore 23 extending into the abutment and formed in the abutment to communicate with the inner end of said bore is an axial passage 24. Leading from the inner end of said passage to the periphery of the abutment is a passage 25 and leading from the inner end of the bore 23 to the periphery of the abutment in angular relation to the passage 25 is a like passage 26. Screwed into the bore 23 of the spindle 20 is a rod 27 which may be adjusted toward the outer end of the passage 24 across the passage 26 so that the rod will thus function as a valve to control flow of fluid through said passages and screwed upon the outer end of the rod is a lock nut 28 for securing the rod in adjusted position. Formed in the abutment 18 in a plane between the outer ends of the passages 25 and 26 is, as shown in Figure 3, a radial slot 29 and slidably fitting in said slot is a blade 30 having a beveled outer edge. Arranged behind the blade are springs 31 pressing the blade outwardly against the wall of the casing 10 and formed in the abutment at the forward side of the blade is a passage 32 leading from the periphery of the abutment to the inner end portion of said slot. Formed in the abutment in advance of the outer end of the passage 26 is a radial slot 33 and slidably fitting in said slot is a blade 34 which is somewhat less in width than the blade 30 and has its outer edge beveled in a direction opposite to the bevel of the outer edge of the latter blade. Arranged behind the blade 34 are springs 35 compressing the blade outwardly into engagement with the wall of the casing and formed through the blade is, as shown in detail in Figures 5 and 6, a medial bore freely accommodating a stop screw 36 threaded into the bottom wall of the slot 33 and having the head thereof countersunk in the outer end of said bore.

It is now to be noted that the abutment 18 is eccentrically mounted within the casing 10 to contact the wall of the casing at one side thereof so that at the opposite side of the casing, a chamber 37 is defined between the abutment and casing in the rear of the blade 30 while at the forward side of the blade is defined a similarly shaped compression chamber 38. Formed through the wall of the casing to enter the chamber 37 is a filling opening 39 normally closed by a screw plug 40 and formed through the wall of the casing to enter the chamber 38 is an air escape opening 41 normally closed by a plug 42. Thus, by removing the plugs 40 and 42, the casing may be filled with a suitable fluid such as glycerine when, of course, the plugs are again arranged in position to seal the casing.

Fixed to the outer end of the spindle 20 is an arm or crank 43 having a ball head 44 and straddling the spring 14 is a clip 45 secured to the axle 15 and equipped at its upper end with an arm 46 having a ball head 47. Extending between the ball head 44 of the crank 43 and the ball head 47 of the clip is a link 48 provided at its ends with sockets 49 to accommodate said heads and screwed into said sockets are plugs 50 adjustable to secure the desired tension between the sockets and the ball heads.

As will now be readily understood, when the spring 14 of the vehicle is compressed, the abutment 18 will be rotated in a clockwise direction, when the fluid in the chamber 37 will wedge past the beveled outer edge of the plate 30 and will thus be allowed to freely flow from the chamber 37 into the chamber 38. However, upon return movement of the spring, causing the abutment to be rotated in a counter-clockwise direction, the flow of fluid from the chamber 38 to the chamber 37 will be blocked by the blade 30 so that as the rotation of the abutment continues and the blade is advanced, the fluid in the chamber 38 will be trapped and compressed for resisting the counter-rotation of the abutment and accordingly resisting the return movement of the vehicle spring. The blade 34 is, of course, provided to form a seal between the abutment and casing in advance of the passage 26 so that as the fluid in the chamber 38 is compressed, the fluid will enter through the passage 32 to the slot 29 behind the blade 30 for forcing this blade outwardly against the wall of the casing to maintain a sealed joint between the blade 30 and the casing while the fluid will also enter through the passage 26 to the passage 24 and thence through the passage 25 to the chamber 37. Flow of fluid through the passages 24, 25 and 26 will, as noted, be regulated by the valve or rod 27, which may be set to suit the tension of the springs of the particular motor vehicle to which the device is applied so that the device will thus function to cushion the return movement of the springs and permit only an easy and gradual rebound of the vehicle body. In this connection, it is to be observed that during the counter-rotation of the abutment 18, displacement of fluid from the chamber 38 will gradually taper from a maximum at the inception of the counter-rotation toward a minimum as the counter-rotation progresses. Accordingly, when the springs of the vehicle are compressed and are, therefore, under greatest tension, the device will offer the greatest resistance to the return movement of the springs and this resistance will taper gradually in conformity with the return flexing of the springs and the relief of tension thereon. Thus, regardless of the degree to which the vehicle springs may be compressed, the device will always function properly to offer a corresponding corelated resistance to the return movement of the springs for rendering such return movement easy and gradual. The stop screw 36 is provided to limit the outward radial movement of the blade 34 in order that, when the abutment is counter-rotated, too great a volume of fluid may not be trapped in front of the blade. Furthermore, said stop screw will prevent the complete ejection of the blade from its slot should the abutment, for any reason, be completely revolved.

Having thus described the invention, what is claimed as new is:

1. A shock absorber including a cylindrical casing, an abutment journaled eccentrically therein, a blade carried by the abutment to coact with a wall of the casing and dividing the space between said wall and the abutment into fluid chambers, and restricted passages in the abutment connecting said chambers.

2. A shock absorber including a cylindrical casing, an abutment journaled eccentrically therein, a blade carried by the abutment to coact with a wall of the casing and dividing the space between said wall and the abutment into fluid chambers, restricted passages in the abutment connecting said chambers, and a valve carried by the abutment for controlling flow through said passages.

3. A shock absorber including a cylindrical casing, an abutment journaled eccentrically therein, a blade carried by the abutment to coact with a wall of the casing and dividing the space between said wall and the abutment into fluid chambers, restricted passages in the abutment connecting said chambers, and a separate passage in the abutment leading from one of said chambers to a point behind the blade.

4. A shock absorber including a cylindrical casing, an abutment journaled eccentrically therein and provided with a slot, a spring pressed blade slidable in said slot to coact with a wall of the casing and dividing the space between the abutment and said wall into fluid chambers, restricted passages in the abutment connecting said chambers, and a separate passage in the abutment connecting one of said chambers with said slot at a point behind the blade.

5. A shock absorber including a cylindrical casing, an abutment journaled eccentrically therein, a spring pressed blade carried by the abutment to coact with a wall of the casing and dividing the space between the abutment and said wall into fluid chambers, the edge of the blade at said wall being beveled, and restricted passages in the abutment connecting said chambers.

6. A shock absorber including a cylindrical casing, an abutment journaled eccentrically therein, a spring pressed blade carried by the abutment to coact with a wall of the casing and dividing the space between the abutment and said wall into fluid chambers, a second spring pressed blade upon the abutment to coact with said wall of the casing in advance of said first mentioned blade, and restricted passages in the abutment connecting said chambers.

7. A shock absorber including a cylindrical casing, an abutment journaled eccentrically therein and provided with a spindle, a spring pressed blade carried by the abutment to coact with a wall of the casing and dividing the space between the abutment and said wall into fluid chambers, restricted passages in the abutment connecting said chambers, the spindle being provided with a bore communicating with certain of said passages, and a rod adjustable in said bore to control the flow of fluid through the passages.

In testimony whereof I affix my signature.

JESSE J. MORSCH. [L. S.]